July 13, 1943. H. A. BOWERS 2,324,191
SPEED CONTROL MECHANISM
Filed Oct. 2, 1941 3 Sheets-Sheet 3

INVENTOR.
HAROLD A. BOWERS
BY Joseph A. Rave
Attorney

Patented July 13, 1943

2,324,191

UNITED STATES PATENT OFFICE 2,324,191

SPEED CONTROL MECHANISM

Harold A. Bowers, Cincinnati, Ohio

Application October 2, 1941, Serial No. 413,284

16 Claims. (Cl. 123—103)

This invention relates to a speed control mechanism for internal combustion engines when employed as a motive power for automobiles, buses, trucks and the like.

One of the principal objects of this invention is the provision of means which will enable a vehicle to operate at a desired or predetermined speed without the necessity of the operator watching a visible speed indicator, such as a speedometer, thereby permitting the operator to devote his entire attention to the road and promoting safe driving.

Another object of this invention is the provision of a mechanism which while useful in assisting in maintaining a predetermined definite speed, may, at will, be manually operated beyond its adjustment for a definite speed but will not change said speed adjustment wherefore the operator my return to said predetermined adjusted speed at will, for example, after an emergency which necessitated the increased or decreased speed.

A still further object of this invention is the provision of means that will definitely indicate to the operator of a vehicle that he is traveling at his predetermined maximum speed but which indicator may be arranged to operate at any other maximum speed he may select.

It is also an object of the present invention to provide means which will substantially maintain constant the amount of fuel being supplied to the engine to thereby limit and maintain a predetermined desired speed of travel and economize on the fuel used.

It is also an object of this invention to provide a mechanism which will accomplish the above objects and at the same time provide means for resting the operator while driving since the supplying of fuel to the motor will require substantially no physical effort on his part to travel at the predetermined speed.

Other objects and advantages of the present invention should be readily apparent by reference to the following specification considered in conjunction with the accompanying drawings forming a part thereof, and it is to be understood that any modification may be made in the exact structural details there shown and described, within the scope of the appended claims, without departing from or exceeding the spirit of the invention.

In the drawings.

Throughout the several views of the drawings similar reference characters are employed to denote the same or similar parts.

As was mentioned above, this mechanism pertains to a speed control means for self-propelled vehicles such as trucks, buses, pleasure cars, and the like. Each of these vehicles today has a self-propelled engine to which fuel is supplied in varying quantities depending upon the desired rate of speed to be traveled. The fuel supply is generally under the control of a foot pedal mounted on the floor of the vehicle and operated by the driver's foot by being depressed when a higher rate of speed than that being traveled is desired. A reverse movement or operation of the foot pedal results in slowing down of the rate of speed from that being presently traveled.

States, counties, and cities have different rates of legal speed that may be pursued in various sections and localities. In order for the operator to be within the legal limit it is necessary for him to watch the visible speed indicator or speedometer and arrange his foot pedal accordingly. This positioning of the foot may be quite tiring or the road conditions may be such that the speedometer is not being carefully watched and the legal speed limit exceeded, or the road conditions may be quite favorable and the operator unconsciously exceeds the established legal speed limit.

By the present invention the operator is consciously checked from exceeding the speed limit at which he desires to travel yet he may, in the case of an emergency, exceed this limit during the time of emergency and then automatically return to the limit which he has established as his top speed; he of course can at any time operate below his desired top speed. These operations are accomplished in substantially the same manner in which they were previously accomplished, namely, through the use of a lever under the control of the operator's foot or under the control of the hand lever, generally mechanically connected with the foot lever. At the same time, with the vehicle traveling at the desired top speed the operator's foot is maintained in a restful position, without any appreciable conscious effort on his part, at which position the desired speed is maintained.

Figure 1:
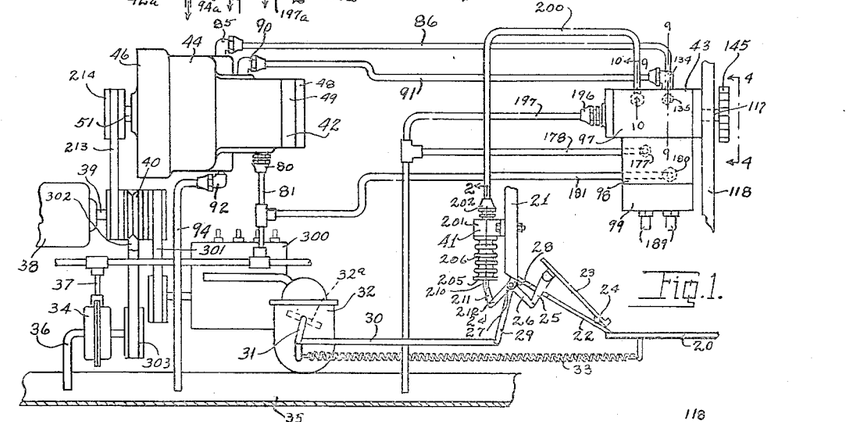
Fig. 1 is a semi-diagrammatic view of the mechaism of this invention.

Specifically, and referring to the drawings, there is illustrated in Fig. 1 a vehicle floor board 20, dash board 21 and inclined connecting board or plate 22. The portions of the vehicle just described are normally located immediately below and in front of the operator's seat or position and located there, also, is the foot pedal 23 hingedly connected at 24 to the inclined floor board or plate 22. Below the foot pedal 23 there is projecting a link 25 which passes through a suitable aperture formed in the floor board 22. The inner end of the link 25 is connected to one end of an arm 26 of a bell crank 27 which is pivotally mounted in a bracket 28 projecting downwardly from the floor board 22. The second arm 29 of the bell crank 27 has pivotally connected to it one end of link 30 which has its other end pivotally connected to an arm 31 of the fuel supply valve 32a such as is associated with the usual carburetor 32. The carburetor, as is well known, supplies the intake manifold of the engine, and the amount so supplied determines the rate of rotation of the engine all of which is well understood and forms no part of the present invention.

It is further understood that depression of the pedal 23, or a counter-clockwise movement thereof about the hinge 24, causes an increased flow of fuel and therefore an increased speed of the engine. This operation of the foot pedal 23 is effected against the resistance of a spring 33 which has one end connected to the valve arm 31 and the other end anchored to a fixed part of the vehicle.

Operated by the engine 300 through any suitable or desirable means, such as the belt 301, pulley 40, belt 302 and pulley 303, is a pump 34 for circulating oil which may be used for lubricating the various parts of the engine, operating the brakes, or other purposes, and which pump generally maintains the said oil at a given pressure. The source of supply for the oil is a sump, tank or the like generally located below the engine and diagrammatically shown at 35 in Fig. 1. Extending from the pump 34 is an intake pipe 36 which has its other end located in the sump or pan 35 and may be supplied with a screen, filter or other purifying mechanism, not shown. Extending from the other side of the pump 34 is the delivery or pressure pipe or conduit 37 terminating, as mentioned above, at the engine for lubricating purposes, or brake cylinders, or the like, none of which is shown as they form no part in the present invention.

Associated with the engine is, generally, an externally driven part, such as, an electric generator 38 provided with a shaft 39 having a pulley 40 for either a belt, a chain, or the like, and driven at the same speed as, or at a speed definitely proportioned to, the speed of the engine. It will be understood that instead of the generator 38, or other part so supplied with vehicles to be so operated, a specific shaft may be supplied to be operated from the engine at a speed definitely proportioned thereto for the purpose of operating the mechanism of this invention, as will later be made clear. Such other part generally supplied with vehicles, and in some instances preferable for the purpose of this invention, is the drive shaft to the driving wheels, speedometer cable, or other member, which has a speed of rotation that is generally more directly proportioned to the speed of travel of the vehicle than to the speed of rotation of the engine, since there is generally provided a set of change gears between the engine and drive shaft and the speedometer cable, and which parts are not shown in the drawings since they are well known.

The mechanism of this invention comprises three principal members, the stop device 41, the actuating pressure developing device 42, hereinafter referred to as a generator, and the actuating pressure selecting device 43.

Figure 11:
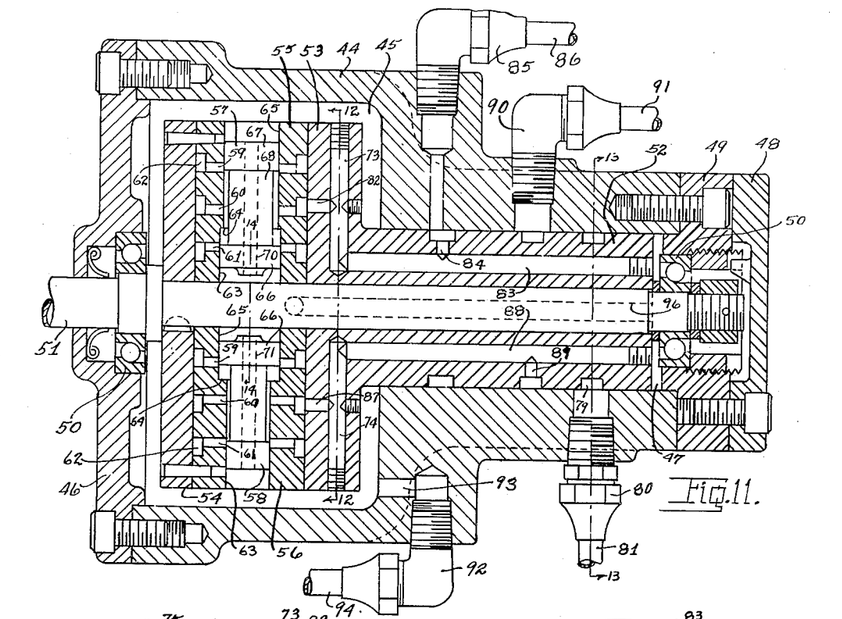
Fig. 11 is an enlarged longitudinal sectional view through a further portion of the mechanism.
Figures 12, 13, 14:
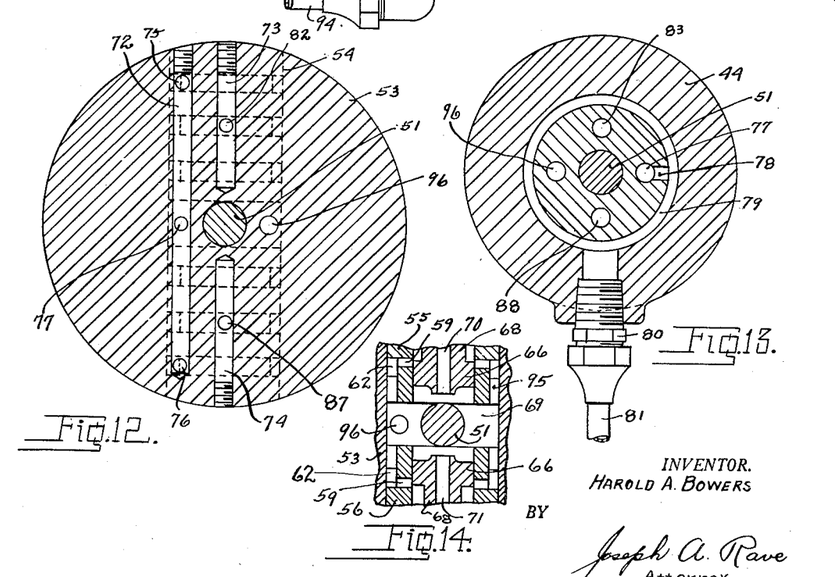
Fig. 12 is a vertical sectional view through certain of the parts of the mechanism taken on line 12—12 on Fig. 11.
Fig. 13 is a transverse sectional view taken through a plane behind that of Fig. 12 on line 13—13 on Fig. 11.
Fig. 14 is a fragmentary sectional view taken on line 14—14 on Fig. 11.

The actuating pressure developing device, or generator 42, is shown in one structural form in Figs. 11 to 14, inclusive, and comprises a housing member 44 having a circular chamber 45 at one end thereof and closed by closure plate 46. Extending from the chamber 45 is a bore 47 closed at its outer end by a plate 48 and intermediate bearing supporting member 49. The bearing supporting member 49 and closure plate 48 are each provided with an anti-friction bearing 50 for supporting, for rotation, a shaft 51. Encircling the shaft 51 and journaled in the housing bore 47 is a sleeve 52 having at its one end, and within the chamber 45, a radial flange or rotor 53, said sleeve 52 and rotor 53 keyed to the shaft 51 for rotation thereby. The rotor 53 has considerable thickness and houses the valves for determining or generating the operating pressure. As seen in Figs. 11 and 12 the rotor 53 is provided with a transverse bore 54 in which, on each side of the shaft 51, is secured a valve bushing 55 and 56. The valve bushings, in turn, respectively enclose a piston valve 57 and 58.

The valve bushings and their enclosed valves are substantially identical in construction, except for weight and diameter as will be subsequently pointed out, wherefore it is deemed sufficient if but one of them be described in detail. Accordingly, valve bushing 55 is provided with a plurality of sets of radial ports, 59, 60 and 61, each set being encircled by a similar circumferential groove 62 formed in the exterior of the bushing 55. The bushing 55 is provided at its inner end with an enlarged bore 63 which terminates at a shoulder 64 from which a smaller bore 65 extends at the other end of the bushing. The piston valve 57, within the bushing bore 63—65, is provided with piston portions 66 and 67, each of a diameter closely simulating that of its bore, and said piston portions are connected by a reduced portion 68. It will be noted that the inner ends of the bushings 55 and 56 terminate on or substantially adjacent the surface of the shaft thereby providing between them a chamber 69, see Fig. 14. Each of the piston valves 57 and 58 is provided centrally with a bore 70 and 71 thereby effecting communication, through said piston valves, between the ends of the bushings, the chamber 45 and the chamber 69, the purpose of which will be explained later.

Behind the bore 54, the rotor 53 is provided with a port 72, located to one side of the shaft 51, and ports 73 and 74, located in a plane including the center or axis of the shaft and are respectively drilled from the opposite sides of the flange 55 toward one another terminating however short of said shaft. The port 72 has communicating with it, near its opposite ends, ports 75 and 76 which terminate respectively with the ports 59 of valve bushings 55 and 56. Communicating also with the port 72 is one end of a port 77 which extends through the sleeve 52 and parallel with the axis thereof. A transverse port 78 in the sleeve 73 connects the port 77 with a groove 79 formed around the exterior of the sleeve 52. The groove 79 in turn is connected through a port in the housing 44 with a pipe fitting 80 which carries one end of a pipe 81 extending from the pump pressure pipe 37.

From the foregoing it will be noted that pressure is connected with the outer ports of each piston valve 57 and 58 to enter the space between the valve piston portions 66 and 67.

The port 73, similar to port 72, has communicating with it one end of a transverse port 82 which communicates, on its inner end, with the valve bushing ports 60 of valve bushing 55. Also communicating with the port 73 is one end of a port 83 extending longitudinally of the sleeve 52, parallel with the port 77, but angularly spaced therefrom. The port 83 communicates through a port 84 with a pipe fitting 85 carrying one end of a pipe 86 which has its other end connected to the actuating pressure selector device 43.

The port 74, similar to port 73, is connected through a transverse port 87 with the bushing ports 60 of valve bushing 56 and, again similar to port 73, has connected therewith one end of a port 88 extending longitudinally of the sleeve 52 parallel with ports 77 and 83 but angularly spaced therefrom. A radial port 89 in the sleeve 52 connects the port 88 with a pipe fitting 90 which carries one end of a pipe or conduit 91 whose other end terminates in the actuating pressure selecting device 43.

A pipe fitting 92 carried by the housing 44 connects the chamber 45 by way of a port 93 with one end of a pipe 94, carried by the fitting 92, with the sump or oil pan 35. The sets of ports 61, through their circumferential groove connect with the chamber 69, between the bushings 55 and 56, by way of vertical ports 95 in the outer surface of said bushings. There is also provided in the sleeve 52, a port 96 which extends longitudinally thereof and connects at its opposite ends the chamber 69 and the space of the bore 47 at the inner end of said sleeve 52, thereby connecting any leakage longitudinally of the sleeve 52 with the chamber 69. This chamber 69 communicates by way of the bores or ports 70 and 71 in the valves 57 and 58 with the chamber 45 and therefore the pipe or conduit 94 and sump or oil pan 35.

The actuating pressure selecting device, in its preferred form, is illustrated structurally in Figs. 5 to 10, inclusive, and comprises three housing members, an upper housing member 97, intermediate housing member 98 and a lower housing member 99 suitably bolted to one another to form a unitary structure. The upper housing member is provided with a bore 100, the opposite ends of which are closed by end caps 101 and 102. Disposed within said bore is a bushing 103 keyed or otherwise fixed against rotative movement. The bushing 103 is provided substantially centrally of its length with a plurality of radial ports, shown in the drawings as six in number and identified by reference characters 104, 105, 106, 107, 108 and 109. These radial ports are at all times in alignment with vertical bores or ports formed through the housing 97 and identified by reference numerals 110, 111, 112, 113, 114 and 115. It should be here noted that the number of radial bores 104—109 in the bushing 103 may be increased or decreased depending entirely upon the range desired in the mechanism and that the number of ports 110—115 will be correspondingly changed.

Figures 5, 6, 7, 8, 9:
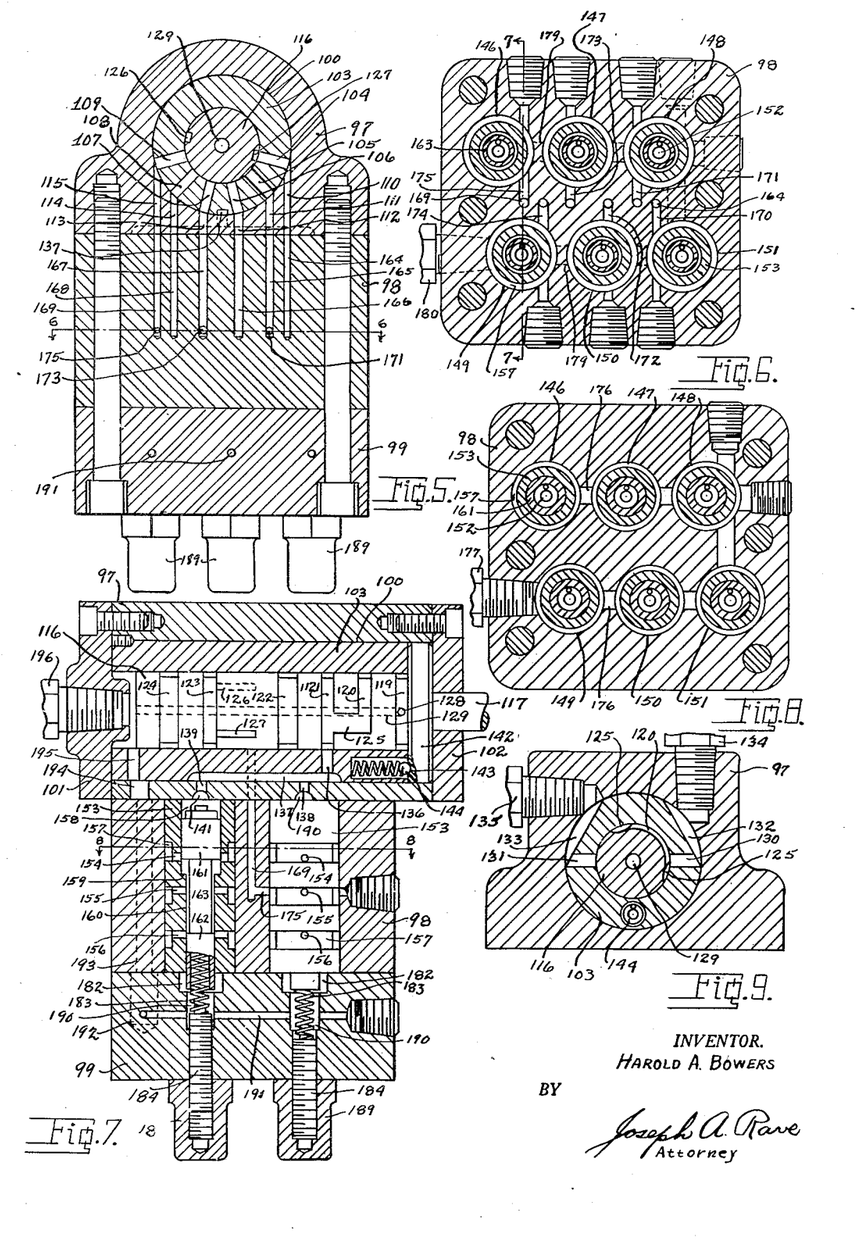
Fig. 5 is an enlarged vertical sectional view through a part of the mechanism taken on line 5—5 on Fig. 1.
Fig. 6 is a transverse sectional view taken on line 6—6 on Fig. 5.
Fig. 7 is a vertical sectional view taken at right angles to Fig. 5 on line 7—7 on Fig. 6.
Fig. 8 is a transverse sectional view similar to Fig. 6 through a plane above that of Fig. 6 on line 8—8 on Fig. 7.
Fig. 9 is an enlarged fragmentary sectional view taken on line 9—9 on Fig. 1.

Mounted within the bushing 103 is a rotary valve member 116 having projecting from one end thereof a shaft 117 which passes through the end cap member 102 and also passes through the panel 118 of the vehicle body. The rotary valve member 116 is provided at spaced points along its length with circumferential grooves 119, 121, 122, 123, and 124 and substantially semi-circumferential groove 120; with the grooves 120 and 121 connected by a pair of spaced longitudinal grooves 125, and with a pair of grooves 126 and 127 extending longitudinally of the valve 116 for a distance from the circumferential groove 123 toward the circumferential groove 122 but without connecting said grooves. A transverse port 128 connects the circumferential groove 119 with a port 129 disposed centrally longitudinally of the valve member 116. As shown in Fig. 9 the semi-circumferential groove 120 is adapted to be in communication with either of two ports 130 and 131 formed radial of the bushing 103 and which ports at their outer ends communicate, respectively, with chambers 132 and 133 formed by inclined cut-away portions on the bushing 103. It is with these chambers 132 and 133 that pipe fittings 134 and 135 respectively communicate and which pipe fittings respectively carry the pipes or conduits 91 and 86 from the actuating pressure developing mechanism 42. The pressure fluid in the port 130 or 131, depending upon which one the groove 120 is in communication with, is transmitted by the longitudinal groove 125 to the circumferential groove 121. The pressure fluid is then connected by the groove 121 with a radial port 136 in the bushing 103 and thereby with a longitudinal port 137 formed for a portion of the length of the bushing 103 intermediate its ends at its lowermost point. The bushing port 137 connects with a pair of ports 138 and 139, formed vertically of the housing 97, and a pair of transverse grooves 140 and 141 for a purpose later to be made clear.

The longitudinal ports or grooves 126 and 127 are adapted to be respectively brought into alignment in successive order with the bushing radial ports 104—109. In order to accurately align and maintain the groove 126 or 127 with the radial ports 104—109 the valve 116 is provided at its forward end with a radial flange or collar 142 having a plurality of detent seats 143 formed therein for cooperation with the spring pressed detent 144 carried by the adjacent end of the bushing 103. The rotation of the valve 116 is accomplished by a knob or the like 145 on the end of the valve shaft 117.

The intermediate housing 98 of the control pressure selector valve mechanism is provided with a plurality of valve bores 146, 147, 148, 149, 150 and 151 each housing a valve mechanism, each of which is substantially identical in construction and identified in general by the reference numeral 152. One valve mechanism 152 is shown in structural detail in Fig. 7 and since each of them is substantially identical, it is deemed sufficient if but one of them be described in detail.

By reference to Fig. 7, it will be noted that the valve mechanism 152 comprises a valve bushing 153 through which is formed a plurality of sets of radial ports 154, 155 and 156 each set of ports being encircled by a similar circumferential groove 157 formed in the exterior of the bushing 153. It should be noted that the valve bushing 153 substantially takes up the entire height of the housing 98 and has its upper end engaging the lower surface of the housing 97 and its lower end engaging the upper surface of the housing 99. Each of the bushings 153 is provided in its upper end with a bore 158 terminating in the shoulder 159 from which a smaller bore 160 extends to the other end of the bushing. Disposed in said bushing bore 158—160 is a piston type valve having the piston portion 161 at its upper end, a piston portion 162 at its lower end and a reduced portion 163 connecting said piston portions.

Formed vertically of the intermediate housing 98 but not extending entirely therethrough is a series of ports 164, 165, 166, 167, 168 and 169 which respectively communicate at their upper ends with a vertical port 110—115 inclusive formed in the upper housing 97. Each of these ports 164—169 is respectively in communication with a transverse port 170, 171, 172, 173, 174 and 175 which in turn respectively communicates with the radial ports 155 of a valve mechanism 152 in the valve bores 146—151, see Fig. 6. The radial ports 154 of each valve mechanism 152 are inter-connected by ports 176 which terminate in a pipe fitting 177 carrying one end of a pipe or conduit 178 that terminates in the sump or oil pan 35. The ports 156 of each valve bushing are likewise inter-connected by means of ports 179 which terminates in a pipe fitting 180 carrying one end of pipe or conduit 181 which is a branch of the pressure pipes or conduits 81 and 37.

The lower housing 99 of the control pressure selecting device is provided with a counter-bore 182 beneath each valve mechanism 152 into which the lower end of the valve piston 162 may project. Each of these valve pistons is hollow for a portion of its length into which projects one end of a spring 183, the other end of which abuts with the upper end of an adjusting screw 184 threaded through the housing 99 and axially aligned with the piston valve. It will be appreciated that each piston valve has its own adjusting screw 184, whereby the loading of each valve spring 183 is individually determined and affected. The end of the adjusting screw 184 is closed by a suitable cap 189 threaded onto the projecting end of the screw 184. It should be noted that the housing 99 is provided with a smaller diameter counter-bore 190 beneath each counter-bore 182 and that these counter-bores 190 are inter-connected with one another by ports 191 which terminate in a pocket 192 which is in communication with a vertical port 193, in the intermediate housing 98, a vertical port 194, in the upper housing 97, vertical port 195, in the bushing 103, and the space or bore of the bushing 103 between the end of the valve 116 and end cap 101. This space is connected by a pipe fitting 196, which carries one end of a pipe 197 that communicates at its other end with the sump or oil pan 35.

It should be noted that transverse grooves or ports 140 and 141, formed in the lower surface of the housing 97, respectively communicate with valve bores 146, 147, and 148 and valve bores 149, 150 and 151 for actuating the piston valves therein for a purpose that will later be made clear.

Referring again to valve 116 its circumferential groove 123 is connected by a radial port 198, in the bushing 103, with a pipe fitting 199 which carries one end of a pipe 200 that terminates in the stop device 41.

Figures 2, 3, 10:
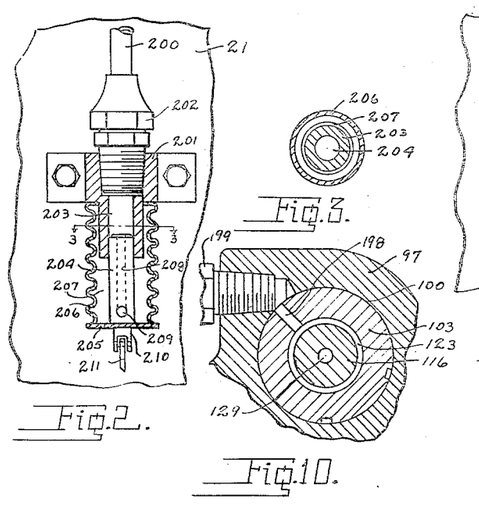
Fig. 2 is an enlarged sectional view taken on line 2—2 on Fig. 1.
Fig. 3 is a transverse sectional view taken on line 3—3 on Fig. 2.
Fig. 10 is an enlarged fragmentary sectional view taken on line 10—10 on Fig. 1.

The stop device 41 is shown structurally in Figs. 2 and 3 and comprises a housing member 201 carrying a pipe fitting 202 which in turn carries the lower end of the pipe or conduit 200. The pipe fitting 202 communicates with a cylinder 203 of the housing 201 in which is mounted for sliding movement, a piston plunger 204. The piston 204 has secured to its lower end a plate 205 which has also secured to it one end of a metallic bellows 206 which has its other end permanently secured to the housing 201. By this construction the metallic bellows 206 provides a chamber 207 interiorly thereof in which is disposed the cylinder 203 and the piston 204. The piston 204 is centrally bored as at 208 which communicates with the chamber 207 by a transverse port 209.

Projecting downwardly from the plate 205 is a clevis 210 having pivotally connected therewith a link 211, see Fig. 1, to whose outer end is pivotally connected one end of a link 212 which has its other end permanently secured to the bell crank 27 so as to partake of any oscillatory movement imparted thereto by the foot pedal 23. As shown in the drawings the stop device housing 201 is bolted or otherwise secured to the inner surface of the dash board 21.

The operation of this mechanism is as follows:

The engine (not shown) is started in the usual way and rotates at what is known as the idling speed, for rotating or driving the pump 34 and circulating the oil or other fluid at its established pressure in the pressure line 37 which, for example, may develope a pressure or approximately 45 pounds per square inch, and for the purpose of this invention may be referred to as the primary pressure. At the same time the engine drives the generator 38 or other shaft having thereon the pulley 40 which through the belt 213 and pulley 214 on the shaft 51, rotates the said shaft 51 and the operating pressure developing member 52—53.

The rotation of the pressure developing member 52—53 through centrifugal action throws the piston valves 57 and 58 outwardly against the oil pressure, thereby more or less opening the ports 59 of the bushings 55 and 56 to allow a pressure flow lubricating oil through the said ports. This pressure flow through the said ports is from the pressure pipe 37 to pressure pipe 81, fitting 80, circumferential groove 79, radial port 78, longitudinal port 77, radial port 72 and ports 75 and 76 to the space surrounding the reduced portions 68 of the valves 57 and 58. The pressure surrounding said piston valve reduced portion acts on the inner surface of larger piston valve portion 66 of said valves to counteract the outward throw thereof under centrifugal force, and co-operates with the centrifugal force in stabilizing the said piston valve at substantially a given position. The opening of the ports 59 effects a lesser or greater opening of the ports 61 by the piston portions 66, whereby a flow of fluid entering by way of ports 59 is returned to the sump or oil pan 35, and the greater the opening of the ports 59 and lesser the opening of ports 61, the greater the pressure around reduced portion 68. The flow from the ports 61 is through ports 95, chamber 69, piston valve bores 70 and 71, chamber 45, port 93, pipe fitting 92 and pipe or conduit 94 to the sump 35. With the actuating pressure generator running at a given speed the ports 59 are opened to permit a certain amount of fluid flow, and therefore develop or generate a given pressure in the space between pistons 66 and 67. As the speed of rotation of the member 52—53 is increased the piston valves 57 and 58 are accordingly urged away from the shaft 51 to open ports 59 and effect an increased pressure from the ports 59 to oppose the centrifugal outward urge of said pistons, thereby, effecting the said stabilizing of the piston valves at the higher speed. Decrease in speed relieves the outward urge on the piston valves whereupon the pressure acting on the piston portion 66 balances the piston valves at a point with a lesser opening of ports 59.

It should be noted at this time that the valve bushings 55 and 56 could have their radial ports 61 eliminated so that there would be no flow of fluid between these ports and the intake ports 59, wherefor there will be only enough flow through the ports to supply the actuating pressure for outflow through the ports 60. The operation of such a device would be as described above.

The pressure surrounding the reduced piston portion 68 is connected to the operating pressure selecting device 93, and this flow from the valve bushing 55 is through ports 60 and 82, radial port 73, longitudinal port 83, radial port 84, pipe fitting 85 and pipe or conduit 86 to the pipe fitting 135. The flow from the bushing 56 is quite similar to that just described, and is by way of bushing radial ports 60, port 87, radial port 74, horizontal port 88, radial port 89, pipe fitting 90, pipe or conduit 91 and pipe fitting 134.

It will be seen that there is a differential or difference in weight between the piston valves 57 and 58, as well as a difference in area between the piston portions of said piston valves wherefore their position outwardly from the shaft 51 at a given speed will be different, or in other words the said piston valves would respectively occupy the same position to their respective ports at different speeds. This difference, in one form of the invention, may be in the nature of a ratio of 2½ to 1 in ultimate results. In other words with the selector mechanism utilizing a given selector valve, the control mechanism comes into operation with one of the pressure developing piston valves at a point 2½ times the speed at which the same selector mechanism was in operation with the other control pressure developing piston, all as will be made clear shortly.

As illustrated in the drawings the particular pressure developing piston valve being employed is the high speed one, namely, piston valve 58 and the circuit controlled thereby. Accordingly the flow of the control pressure is, at this time, from the pipe fitting 134 to the chamber 132, radial port 130, semi-circumferential groove 120 of the rotary valve 116, longitudinal groove 125, circumferential groove 121, vertical port 136, longitudinal port 137, vertical ports 138 and 139 and transverse ports 140 and 141. In other words this pressure is acting on each of the piston valves of each valve mechanism 152 for attempting to actuate said piston valves against their springs 163. As a matter of fact, the particular pressure therein will effectively operate only the piston valve which is adjusted for that particular pressure. As seen in Fig. 5 the selector valve 116 is arranged to have its longitudinal groove 127 aligned with vertical ports 110 and 164 which through the transverse port 170 is connected with the valve mechanism 152 in valve bore 151. With the parts in the position shown in the drawings it is the adjustment of the spring 183 of this valve only that is controlling the speed of the vehicle.

Figure 4:
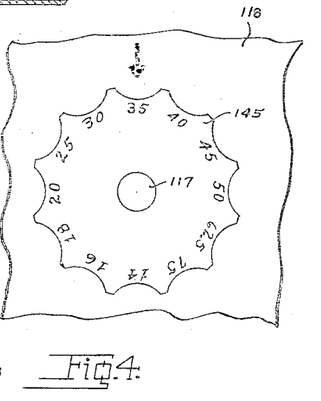
Fig. 4 is an enlarged fragmentary elevational view of a part of the mechanism as seen from line 4—4 on Fig. 1.

As shown in Fig. 4 this speed is 35 miles an hour or the position in the high speed range and the slowest speed capable of control by valve piston 58.

When the motor speed is sufficient to drive the vehicle at the select speed of 35 miles per hour, the pressure acting on the valve piston in the bore 151 actuates said piston to open the radial ports 156 and close the ports 154. This adjustment of these parts controls a flow of the operating fluid from the pressure lines 37 and 81 through the pressure line 181, pipe fitting 180, cross ports 179, valve bushing ports 156, reduced portion 163 of the piston valve, ports 154, cross ports 176, pipe fitting 177, and pipe or conduit 178 to the sump or oil pan 35. It will be appreciated that the opening of the ports 156 effects a flow therethrough to and through the ports 154 to the sump or pan 35, establishing a pressure around the piston ports 163. The pressure surrounding the piston valve reduced portion 163 flows through the ports 155, connecting port 170 in the housing 98, vertical ports 164 and 110, bushing radial port 104, selector valve longitudinal port 127, selector valve circumferential groove 123, bushing radial port 198, pipe fitting 199, pipe or conduit 200 to the stop device 41. This pressure within the stop device acts on the piston 204 and its plate 205 for actuating it in a downward direction as seen in Figs. 1 and 2.

The pressure in the stop device is from pipe 200 through pipe fitting 202, cylinder 203, piston plunger bore or port 208 and cross port 209. The pressure acting on the piston 204 and its plate 205 opposes through the linkage 211—212, bell crank 27 and link 25 the further depression of the pedal 23.

With the parts in the positions set forth in the drawings, there is no pressure acting on the piston 204, and its plate 205, and the pedal 23 is in its normal or motor idling speed position. The operator, therefore, by placing his foot on the pedal will, by its own weight, displace the pedal 23 and elevate the piston 204 and its plate 205 thereby opening the carburetor to speed up the rate of rotation of the engine. As the engine speed increases the speed of the control pressure member increases to displace the piston valves 57 and 58 and thereby increase the actuating pressure in the pipes or conduits 86 and 91 and thereby increase the pressure acting on all of the selector mechanism pistons. As soon as the pressure reaches the point of overcoming the selected piston of the selector mechanism, in the example illustrated, the piston in the valve bore 151, this piston valve is operated to connect the branch pressure line 181 with the piston plunger 204 and tend to stop further movement of the operator's foot. As was mentioned above, this point is reached when the pedal 23 is in the position for operating the vehicle at the rate of 35 miles per hour. If the operator decides to exceed this limit physical force will be necessary to overcome the pressure in the pipe 200 and backup the pressure in this line. This backing up pressure acts on the larger piston 161 to open ports 154 and connect to the sump. If the operator does not desire to exceed his selected speed, he upon reaching the point where physical force is necessary to increase his rate of travel, is automatically made aware of the fact that he is traveling at the speed which he desired, and instead of increasing his speed merely allows his foot to rest in a comfortable position on the pedal 23 with his vehicle traveling at his desired maximum speed. In the event, however, an emergency arises requiring a greater speed, such as to pass another vehicle, he can readily do so by pushing forward on the pedal 23. Should it be desired to slow up the speed of the vehicle it is only necessary to slightly raise the foot whereupon the normal spring 33 will elevate the pedal.

When an up-grade in the road is encountered the vehicle normally slows down unless additional fuel is supplied to the engine. Without the use of the speed control mechanism as disclosed herein, the operator consciously depresses the pedal 23 to supply the additional fuel, not necessarily maintaining his desired speed. With the speed control mechanism maintaining the desired speed, however, this further depression of the pedal 23 results in no increase of vehicle speed. Thus there is no increase in the rate of rotation of the driving force to the shaft 51, no increase in the centrifugal force acting upon the piston valves 57 and 58, no further opening of the ports 59 with a corresponding closing of the ports 61, no increase in the pressure through the ports 66, so that no greater pressure acts upon the piston valves 152. The weight of the operator's foot is thereby counterbalanced in a new position for up-grade travel at the selected speed. This operation of the mechanism takes place automatically wherefor, with the speed control mechanism functioning as disclosed herein, there is substantially no change in speed upon encountering an up-grade on which the engine is capable of maintaining the selected speed. When a nominal down grade is encountered, the reverse action takes place, the weight and momentum of the vehicle being added to the power supplied by the engine, with a resultant decrease in fuel demanded by the engine to maintain the desired speed. Were the operator to resist the urge of the stop pressure upon the pedal under these conditions, the speed of the vehicle and of the engine would be increased slightly with a resultant increase in the rate of rotation of the driving force to the shaft 51. The centrifugal force acting upon the piston valves 57 and 58 would be greater and would balance these piston valves against a greater pressure upon their enlarged portions 66 due to their shifting toward a slightly greater opening of the ports 59 with a corresponding closing of the ports 61. This augmented pressure through the ports 60 as previously explained, would act upon the piston valves 152 to further compress their springs 183. That valve whose spring is adjusted for the selected speed would shift slightly toward the position which would permit the flow of a higher pressure to the stop mechanism as previously explained, urging the pedal 23 toward a new position to decrease the fuel supply to the engine until the selected speed were resumed. However, since the operator is merely resting the weight of his foot upon the pedal 23, he will not resist the aforementioned upward urge upon it, but will merely allow the weight of his foot to be counterbalanced in a new position for down grade travel at the selected speed. This operation of the speed control mechanism may be said to take place automatically with the result that there is substantially no change in speed upon encountering a down grade on which the compression drag of the engine is sufficient in braking power to prevent an increase in the vehicle speed.

It should be noted that each of the piston valves of each valve mechanism 152 is independently adjusted so as to provide the same pressure, when combined with the resistance of the spring 33, within the stop device 41 for resting or counterbalancing the weight of the operator's foot when a given speed is reached. This speed as indicated on the control knob or dial in Fig. 4, for example, ranges from 35 to 75 miles per hour in the high speed range and from 14 to 30 miles per hour in the low speed range. As was pointed out above the high speed range is obtained through the generator piston valve 58 while the low speed range is obtained through the generator piston valve 57. These parts, as was mentioned above, are to be so balanced that when the selector valve 116 has its groove 127 in alignment with either of the bushing radial ports 104 and 109 inclusive this speed will be 2½ times greater than that obtained when the companion longitudinal port 126 is in alignment with the said radial ports 104 to 109 inclusive. In other words with the longitudinal port 127 connected with radial port 104 a speed of 35 miles per hour is controlling while if the longitudinal port 126 were in alignment with the radial port 104 a speed of 14 miles per hour would be controlling. This is caused by the connection of the semi-circumferential groove 120 with the radial port 131 of the bushing 103 and the chamber 133 with which the controlling pressure, as effected by the piston valve 58, is connected as above described. It is understood, of course, that these speeds are by way of example only and may be varied within any desired range. It will also be understood that the ratio between the piston valves 57 and 58 may be changed upward or downward from 2½ to 1 thereby making the low limit and the high limit closer to or farther from one another, this being of course controlled primarily by whether the device is to be used on trucks, buses, or pleasure vehicles, or even other types of self-propelled vehicles.

Figure 15:
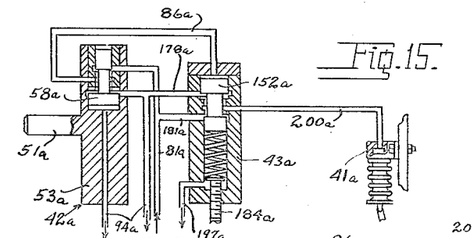
Fig. 15 is a diagrammatic view showing a simplification or modification of the mechanism of this invention.

The foregoing description has dealt with a mechanism wherein the operator can select a speed within a given range and with the mechanism providing a high and a low speed range and a plurality of actuating or controlling pressures. The mechanism diagrammatically illustrated in Fig. 15 is a material simplification of the device and utilizes but one actuating pressure developing piston valve such as 58a delivering the pressure to but a single valve mechanism such as 152a from which the actuating pressure is delivered to the stop mechanism 41. In this case the operator may have the screw 184a arranged so that he can adjust the same while his vehicle is in motion and would adjust it to the speed to which he desires to travel due to prevailing conditions. It will, of course, be understood that the screw 184a could be out of reach while driving, and would therefore act as a maximum speed limit, the operator operating the pedal 23 in the normal manner for speeds under his desired maximum. A larger effective area in the actuator may be used to definitely prohibit higher speeds if required.

Reference to pressure flow herein does not necessarily mean fluid flow. Static pressure may be considered to flow by means of entering the same pressure through the ports, conduits, etc.

From the foregoing it will now be appreciated that there has been provided a speed control mechanism which will automatically indicate to the operator that he is traveling at his safest speed of his own selection consistent with operating conditions, and that this speed can be maintained with a minimum of effort on his part. At the same time he is given a warning when he reaches his speed limit although he may exceed this limit if he so desires. This mechanism further provides for the comfort of the operator since his foot is in a restful position and not under constant strain to maintain a speed at or below the legal maximum speed.

What is claimed is:

1. In a mechanism of the class described the combination with an engine, a fuel supply mechanism, and a manually operable member for controlling the operation of the fuel supply mechanism operable through a given path of movement from a point indicating minimum rate of movement of the vehicle to a point indicating maximum rate of movement of a vehicle, of a hydraulically operated stop for limiting the operation of the manually operable member when the vehicle speed reaches a predetermined maximum.

2. In a mechanism of the class described the combination with an engine, a fuel supply mechanism, and a manually operable member for controlling the operation of the fuel supply mechanism to control the rate of operation of a vehicle, of a hydraulically operated stop for limiting the operation of the manually operable member when the vehicle speed reaches a predetermined maximum, including means for generating a hydraulic pressure, a hydraulic system for said stop, and a valve operated by the generated pressure for connecting the hydraulic system with the stop.

3. In a mechanism of the class described the combination with means for feeding fuel to an engine, a manually operable member for controlling the operation of the fuel feeding means, and means for circulating a fluid under pressure, of a hydraulic stop connectable with fluid under pressure for limiting the operation of the manually operable member, a valve operable for connecting the fluid under pressure with the stop, and means for effecting the operation of the valve.

4. In a mechanism of the class described the combination with means for feeding fuel to an engine, a manually operable member for controlling the operation of the fuel feeding means, and means for circulating a fluid under pressure, of a hydraulic stop connectable with fluid under pressure for limiting the operation of the manually operable member, a valve operable for connecting the fluid under pressure with the stop and means for effecting the operation of the valve, said valve being yieldably adjustable whereby the hydraulic stop may be forcibly displaced to permit movement of the manual member beyond its normal stop position.

5. In a mechanism of the class described the combination with means for feeding fuel to an engine, a manually operable member for controlling the operation of the fuel feeding means, and means for circulating a fluid under pressure, of a hydraulic stop connectable with fluid under pressure for limiting the operation of the manually operable member, a valve operable for connecting the fluid under pressure with the stop, and means for effecting the operation of the valve, and said valve operating means being connected with the engine for energization thereby whereby said valve operating means is operated at a point consistent with the engine speed.

6. In a mechanism of the class described the combination with means for feeding fuel to an engine, a manually operable member for controlling the operation of the fuel feeding means, and means for circulating a fluid under pressure, of a hydraulic stop connectable with fluid under pressure for limiting the operation of the manually operable member, a valve operable for connecting the fluid under pressure with the stop, and means for effecting the operation of the valve, and said valve operating means being connected with the engine for energization thereby whereby said valve operating means is operated at a point consistent with the engine speed, and means for preadjusting the position of the valve for limiting the movement of the manually actuable lever and limiting the speed of the engine.

7. In a mechanism of the class described the combination with means for feeding fuel to an engine, a manually operable member for controlling the operation of the fuel feeding means, and means for circulating a fluid under pressure, of a hydraulic stop connectable with fluid under pressure for limiting the operation of the manually operable member, a valve operable for connecting the fluid under pressure with the stop, means for effecting the operation of the valve, said valve operating means being connected with the engine for energization thereby whereby said valve operating means is operated at a point consistent with the engine speed, and means for preadjusting the position of the valve for limiting the movement of the manually actuable lever and limiting the speed of the engine, said stop being adapted to be physically displaced with respect to its effective position of adjustment to permit actuation of the manual member beyond its normal stop position and effect an increase speed of rotation of the engine.

8. In a speed control mechanism for internal combustion engine driven vehicles the combination with a fuel supply device for the engine, a manually operable member for operating the fuel supply device, and a hydraulic system for circulating a hydraulic fluid under pressure, of means driven by said engine at a speed proportional to the speed of the vehicle driven by the engine and connected to the hydraulic system for generating a pressure proportional to the speed of the vehicle, a hydraulic stop operable by said control pressure generating mechanism for limiting the speed of the engine, and means to connect the hydraulic fluid under pressure and hydraulic stop when the generated pressure has reached a predetermined point with regard to the rate of speed of the vehicle.

9. In a speed control mechanism for internal combustion engine driven vehicles the combination with a fuel supply device for the engine, a manually operable member for operating the fuel supply device, and a hydraulic system for circulating a hydraulic fluid under pressure, of means driven by said engine at a speed proportional to the speed of the vehicle driven by the engine and connected to the hydraulic system for generating a pressure proportional to the speed of the vehicle, a hydraulic stop operable by said control pressure generating mechanism for limiting the speed of the engine, and means to connect the hydraulic fluid under pressure and hydraulic stop when the generated pressure has reached a predetermined point with regard to the rate of speed of the vehicle, said fluid pressure and stop connecting means including an adjustable valve for adjusting the point of generated pressure control of the stop, and means for adjusting said valve.

10. In a speed control mechanism for internal combustion engine driven vehicles the combination with a fuel supply device for the engine, a manually operable member for operating the fuel supply device, and a hydraulic system for circulating a hydraulic fluid under pressure, of means driven by said engine at a speed proportional to the speed of the vehicle driven by the engine and connected to the hydraulic system for generating a pressure proportional to the speed of the vehicle, a hydraulic stop operable by said control pressure generating mechanism for limiting the speed of the engine, and means to connect the hydraulic fluid under pressure and hydraulic stop when the generated pressure has reached a predetermined point with regard to the rate of speed of the vehicle, said fluid pressure and stop connecting means including an adjustable valve for adjusting the point of generated pressure control of the stop, and means for adjusting said valve, said stop being capable of displacement by physical force on the manually operable member whereby the hydraulic pressure on the stop is overcome.

11. In a speed control mechanism of the class described for internal combustion engines, the combination with a fuel supply device for controlling the rate of supply of fuel to the engine and therefore the rate of travel of a vehicle driven by the engine, a manually operable member for operating the fuel supply device, and a hydraulic system for circulating a hydraulic fluid under pressure, of means for determining the ultimate desired speed of the vehicle comprising a control pressure generator driven by the engine and connected with the hydraulic system for modifying the pressure therein to control use, a hydraulic stop operated by the hydraulic fluid under pressure for limiting the operation of the manual member and therefore the operation of the fuel supply device, and means operated by the control pressure generator for selectively connecting the hydraulic pressure with said stop whereby said stop is effective upon the vehicle reaching a predetermined speed.

12. In a speed control mechanism of the class described for internal combustion engines, the combination with a fuel supply device for controlling the rate of supply of fuel to the engine and therefore the rate of travel of a vehicle driven by the engine, a manually operable member for operating the fuel supply device, and a hydraulic system for circulating a hydraulic fluid under pressure, of means for determining the ultimate desired speed of the vehicle comprising a control pressure generator driven by the engine and connected with the hydraulic system for modifying the pressure therein to control use, a hydraulic stop operated by the hydraulic fluid under pressure for limiting the operation of the manual member and therefore the operation of the fuel supply device, and means operated by the control pressure generator for selectively connecting the hydraulic pressure with said stop whereby said stop is effective upon the vehicle reaching a predetermined speed, said selecting means including a plurality of independently selectable valves each operable to connect the hydraulic pressure with the stop upon the vehicle reaching a different speed.

13. In a speed control mechanism of the class described for internal combustion engines, the combination with a fuel supply device for controlling the rate of supply of fuel to the engine and therefore the rate of travel of a vehicle driven by the engine, a manually operable member for operating the fuel supply device, and a hydraulic system for circulating a hydraulic fluid under pressure, of means for determining the ultimate desired speed of the vehicle comprising a control pressure generator driven by the engine and connected with the hydraulic system for modifying the pressure therein to control use, a hydraulic stop operated by the hydraulic fluid under pressure for limiting the operation of the manual member and therefore the operation of the fuel supply device, and means operated by the control pressure generator for selectively connecting the hydraulic pressure with said stop whereby said stop is effective upon the vehicle reaching a predetermined speed, said selecting means including a plurality of independently selectable valves each operable to connect the hydraulic pressure with the stop upon the vehicle reaching a different speed, and means for selecting and indicating which of the valves is to be in operation and thereby preselecting the ultimate speed of the vehicle.

14. In a speed control mechanism of the class described for internal combustion engines the combination with a fuel supply device for controlling the rate of supply of fuel to the engine and therefore the rate of translation of a vehicle driven by the engine, a manually operable member for operating the fuel supply device, and a hydraulic system for circulating a hydraulic fluid under pressure, of means for determining the ultimate desired speed of the vehicle comprising a control pressure generator driven by the engine and connected with the hydraulic system of modifying the pressure therein to control use, a hydraulic stop operated by the hydraulic fluid under pressure for limiting the operation of the manual member and therefore the operation of the fuel supply device, means operated by the control pressure generator for selectively connecting the hydraulic pressure with said stop whereby said stop is effective upon the engine reaching a predetermined speed and thereby through the control pressure generator developing a predetermined control pressure, said selecting means including a plurality of independently selectable valves each operable to supply the required stop pressure to the hydraulic stop upon the engine reaching a different speed, said control pressure generator, generating two different pressures delivered simultaneously to the pressure selecting mechanism, and means operated simultaneously with the pressure selecting valve means for selecting the generated pressure desired.

15. A speed control device of the class described comprising a pressure generating mechanism driven from an internal combustion engine and at a rate of speed proportional thereto and including a pair of piston valves for respectively generating a different pressure but at a definite ratio one to the other regardless of the speed of operation of the generator or the engine, a hydraulic stop operable to limit the amount of fuel to be supplied to the engine and thereby limit and maintain the speed of rotation of the engine, and a pressure selecting and determining device between the pressure generating device and stop comprising a plurality of valves and a selector mechanism, a hydraulic fluid under pressure under control of said plurality of valves, said selector mechanism selecting which of the two pressures of the generating device is to be employed and which of the plurality of valves is to be operated to connect the hydraulic fluid to the hydraulic stop, and independent means for adjusting each valve to thereby require a different pressure for operating each valve with each of the generating pressures.

16. A speed control device of the class described comprising a pressure generating mechanism driven from an internal combustion engine and at a rate of speed proportional thereto and including a pair of piston valves for respectively generating a different pressure but at a definite ratio one to the other regardless of the speed of operation of the generator or the engine, a hydraulic stop operable to limit the amount of fuel to be supplied to the engine and thereby limit and maintain the speed of rotation of the engine, and a pressure selecting and determining device between the pressure generating device and stop comprising a plurality of valves and a selector mechanism, a hydraulic fluid under pressure under control of said plurality of valves, said selector mechanism selecting which of the two pressures of the generating device is to be employed and which of the plurality of valves is to be operated to connect the hydraulic fluid to the hydraulic stop, and independent means for adjusting each valve to thereby require a different pressure of operating each valve with each of the generating pressures and means for indicating which valve is selected and simultaneously indicating the speed of the vehicle at which the hydraulic stop will operate.

HAROLD A. BOWERS.